United States Patent
Scrivano et al.

(10) Patent No.: US 12,073,232 B2
(45) Date of Patent: Aug. 27, 2024

(54) UNIKERNEL FOR WEBASSEMBLY CONTAINERS

(71) Applicant: Red Hat, Inc., Raleigh, NC (US)

(72) Inventors: Giuseppe Scrivano, Milan (IT); Daniel Walsh, Augusta, GA (US); Sergio Lopez Pascual, Madrid (ES)

(73) Assignee: Red Hat, Inc., Raleigh, NC (US)

( * ) Notice: Subject to any disclaimer, the term of this patent is extended or adjusted under 35 U.S.C. 154(b) by 148 days.

(21) Appl. No.: 17/955,216

(22) Filed: Sep. 28, 2022

(65) Prior Publication Data
US 2024/0103882 A1   Mar. 28, 2024

(51) Int. Cl.
G06F 9/445    (2018.01)
G06F 9/455    (2018.01)
H04L 67/025   (2022.01)

(52) U.S. Cl.
CPC .......... *G06F 9/445* (2013.01); *G06F 9/45533* (2013.01); *H04L 67/025* (2013.01)

(58) Field of Classification Search
CPC .... G06F 21/445; G06F 9/445; G06F 9/45533; H04L 67/025
See application file for complete search history.

(56) References Cited

U.S. PATENT DOCUMENTS

| | | | |
|---|---|---|---|
| 9,886,303 B2 | 2/2018 | Koller Jemio et al. | |
| 10,402,187 B2 | 9/2019 | Turovsky et al. | |
| 10,983,847 B2 | 4/2021 | Drepper | |
| 2022/0188815 A1* | 6/2022 | Higgins | G06Q 20/4014 |
| 2023/0177192 A1* | 6/2023 | Magen | G06F 21/53 726/28 |
| 2024/0004688 A1* | 1/2024 | Shigemori | G06F 9/455 |

OTHER PUBLICATIONS

Simon Kuenzer et al.; Unikraft: Fast, Specialized Unikernels the Easy Way; ACM; pp. 376-394; retrieved on Jan. 17, 2024 (Year: 2021).*
Orestis Lagkas Nikolos et al.; Extending storage support for unikernel containers; ACM; pp. 31-36; retrieved on Jan. 17, 2024 (Year: 2019).*

(Continued)

*Primary Examiner* — S. Sough
*Assistant Examiner* — Cuong V Luu
(74) *Attorney, Agent, or Firm* — Kilpatrick Townsend & Stockton LLP

(57) ABSTRACT

Systems and methods for deploying and running webassembly workloads on compute nodes using a webassembly unikernel. A computing device having a processor generates, using a container engine, a container runtime. The computing device generates, using the container runtime, a unikernel configured to run a plurality of webassembly applications, thereby resulting in a webassembly unikernel. The computing device may receive a request to run an application. A container image corresponding to the application may be retrieved, via the container engine, from a container registry. A webassembly payload may be stored for the application from the container image. Furthermore, the computing device may cause the webassembly unikernel to run the webassembly payload for the application.

20 Claims, 5 Drawing Sheets

(56) References Cited

OTHER PUBLICATIONS

FAASM: Lightweight Isolation for Efficient Stateful Serverless Computing, Simon Shillaker, Peter Pietzuch Jun. 19, 2020, Imperial College London, pp. 1-15—15 Pages https://arxiv.org/pdf/2002.09344.pdf.
Manage WebAssembly Apps Using Container and Kubernetes Tools; 2020-2021, Second State, Accessed: Jun. 24, 22; pp. 1-4—4 Pages https://www.secondstate.io/articles/manage-webassembly-apps-in-wasmedge-using-docker-tools/.
Unikraft: Fast, Specialized Unikernels the Easy Way; Simon Kuenzer, et al. NEC Laboratories Europe Gmb et al. EuroSys '21, Apr. 26-29, 2021, Online, United Kingdom, pp. 1-19—19 Pages.
WasmEdge, GitHub, Inc., 2022, Accessed Date: Jun. 24, 2022, pp. 1-5—5 Pages.
Containerizing WebAssembly Considering WebAssembly Containers on IoT Devices as Edge Solution Fredrik Eriksson, Sebastian Grunditz, Department of Computer and Information Science, Linköpings universitet/Linköping University, Bachelor's thesis, 16 ECTS, Programming, Spring 2021, pp. 1-11—11 Pages LIU-IDA/LITH-EX-G-21/036—SE .
Krustlet Brings WebAssembly to Kubernetes with a Rust-Based Kubelet Mike Melanson; The New Stack, Jun. 15, 2021, pp. 1-6, 6 Pages.

\* cited by examiner

UNIKERNEL FOR WEBASSEMBLY CONTAINERS

BACKGROUND

A kernel is a computer program at the core of a computer's operating system and generally has control over the operating system. The kernel may also function as a hypervisor to divide up the host computer's resources (e.g., operating system) into multiple virtual machines (e.g., kernel based virtual machines (KVM)). These virtual machines may each be supported by a separate kernel stemming from the operating system kernel of the host computer.

A container image is a static file with executable code that can create a container on a computing system. A container image can be deployed in various computer environments and may include components necessary for a container to run (e.g., a container engine, system libraries, utilities, configuration settings, and specific workloads that should run on the computer). The container image may share the operating system kernel of the host, thus obviating the need to include a full operating system. Sometimes, container images need to be deployed and run in separate kernel based virtual machines.

Some container images may be used to run webassembly applications. A webassembly (also referred to herein as "WASM") may refer to a portable binary-code format and may refer to a corresponding text format for executable programs as well as software interfaces (e.g., virtual machines) for facilitating interactions between such programs and their host environments.

SUMMARY

The present disclosure provides new and innovative systems and methods for deploying and running webassembly workloads on compute nodes using a webassembly unikernel. In an example method, a computing device having a processor generates, using a container engine, a container runtime. The computing device generates, using the container runtime, a unikernel configured to run a plurality of webassembly applications, thereby resulting in a webassembly unikernel. The computing device may receive a request to run an application. A container image corresponding to the application may be retrieved, via the container engine, from a container registry. A webassembly payload may be stored for the application from the container image. Furthermore, the computing device may cause the webassembly unikernel to run the webassembly payload for the application.

In some embodiments, method may further include deploying the webassembly unikernel to a virtual machine. The webassembly unikernel may run the webassembly payload for the application on the virtual machine. In some aspects, the webassembly payload may be stored in a memory associated with the virtual machine. Also or alternatively, the webassembly payload may be stored in local container storage of the computing device.

In some embodiments, the request may specify, to the container engine, the container image corresponding to the application. Furthermore, retrieving the container image may further comprise unpacking, from the container image, the webassembly payload for the application.

In some embodiments, causing the webassembly to run the webassembly payload may include sending, to the webassembly unikernel, the webassembly payload for the application. Also or alternatively, a location of the stored webassembly payload for the application may be sent to the webassembly unikernel.

In an example, a system for deploying and running webassembly workloads on compute nodes using a webassembly unikernel is disclosed. The system may include a processor and a memory storing computer-executable instructions. When the instructions are executed by the processor, the instructions cause the processor to: generate, using a container engine, a container runtime; generate, using the container runtime, a unikernel configured to run a plurality of webassembly applications, thereby resulting in a webassembly unikernel; receive a request to run an application; retrieve, via the container engine, a container image corresponding to the application from a container registry; store a webassembly payload for the application from the container image; and cause the webassembly unikernel to run the webassembly payload for the application.

In another example, a non-transitory computer-readable medium is disclosed for use on a computer system containing computer-executable programming instructions for performing one or more methods described herein.

Additional features and advantages of the disclosed method and apparatus are described in, and will be apparent from, the following Detailed Description and the Figures. The features and advantages described herein are not all-inclusive and, in particular, many additional features and advantages will be apparent to one of ordinary skill in the art in view of the figures and description. Moreover, it should be noted that the language used in the specification has been principally selected for readability and instructional purposes, and not to limit the scope of the inventive subject matter.

DETAILED DESCRIPTION OF EXAMPLE EMBODIMENTS

Figure 1:
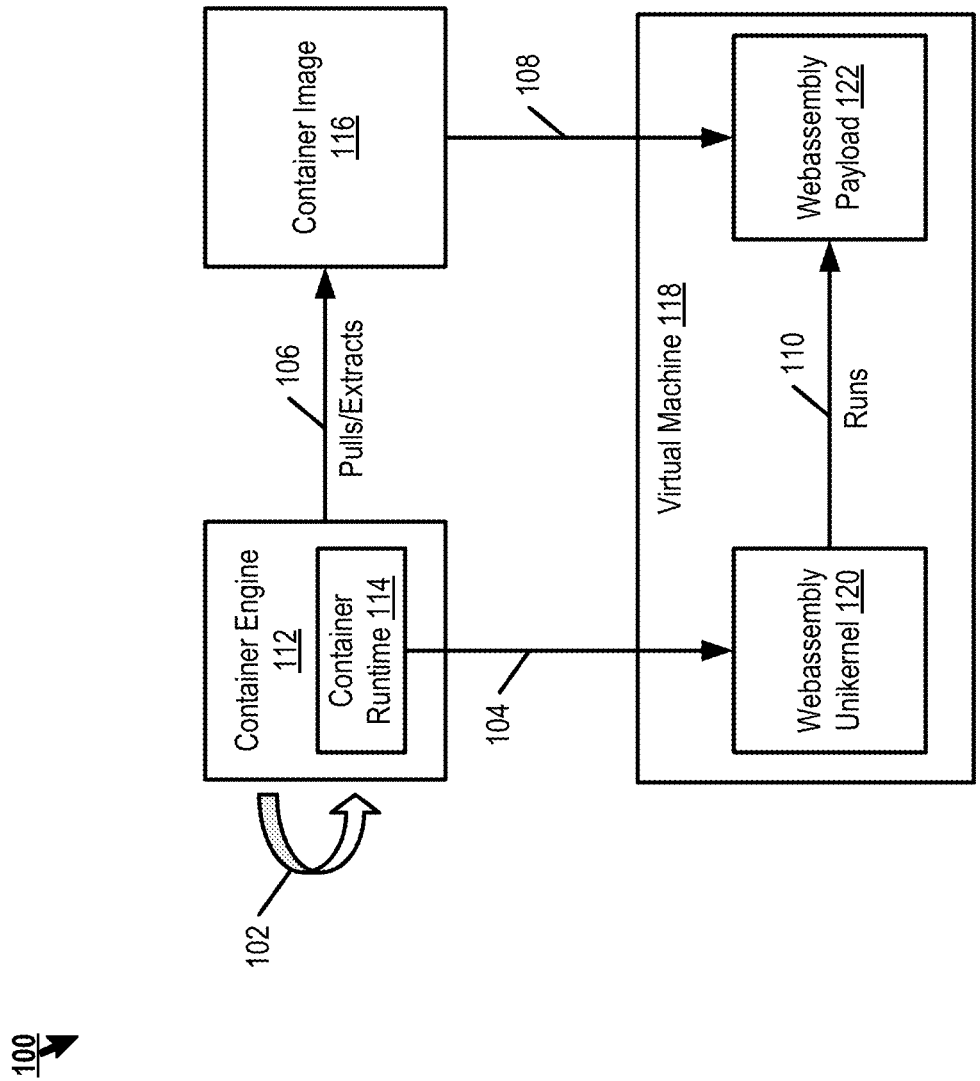
FIG. 1 is a block diagram showing an example process by which a webassembly container engine can deploy and run a webassembly application using a webassembly unikernel, according to an example embodiment of the present disclosure.

As previously discussed, an operating system kernel may utilize, or function as, a hypervisor to divide up a host computer's resources (e.g., operating system) into multiple virtual machines (e.g., kernel based virtual machines (KVM)). Such virtual machines can each be supported by separate kernels. In some aspects, such separate kernels supporting the virtual machines may stem from or be formed out of the operating system kernel of the host computer. These separate kernels often have limited resources that may prevent the deployment or running of applications, programs, or payloads. As also previously discussed, a container image can be deployed in various computer environments and may include components necessary for a container to run (e.g., a container engine, system libraries, utilities, configuration settings, and specific workloads that should run on the computer). However, running container images in a separate kernel of a virtual machine (e.g., as in KVMs) is computationally expensive because the kernel used by the virtual machine may need to have enough features to handle the container images available. Generally, in order for a kernel-based virtual machines (KVMs) to run containers from container images, a stripped down version of Linux is used. However, such versions of Linux may only be supported by a few devices. There is thus a desire and need to allow virtual machines and other compute nodes with limited capabilities to more easily support, deploy, and run a greater variety of applications and payloads. There is also a desire and need for those applications and payloads to be run in isolation, e.g., in a given kernel-based virtual machine and/or in a given compute node. Furthermore, there is a desire and need for the underlying compute node to be cognizant of the application running on it (e.g., via a virtual machine), so as to prevent unauthorized access or execution of unintended or malicious software.

The present disclosure describes solutions that allow individual virtual machines and other compute nodes to be able to successfully deploy and/or run applications and payloads on compute nodes securely (e.g., in isolation), in a manner where the underlying compute node is aware of the application being run. Various embodiments of the present disclosure involve the use of a unikernel, a sealed, fixed-purpose machine image that can be directly deployed to cloud or embedded environments at low cost, without the need for an intervening operating system. As will be discussed herein, unikernels are much slimmer than kernels in that unikernels may have just enough features to run a specific application payload. One or more embodiments describe configuring a unikernel to be able to run a plurality of webassembly applications. The configured unikernel, referred to herein as a webassembly unikernel may be deployed to a virtual machine. When an application is requested to be run on the virtual machine, a container image corresponding to the application may be retrieved via a container engine. A webassembly payload for the application may be stored from the container image. The webassembly unikernel deployed in the virtual machine may be used to run the webassembly payload, thereby allowing the virtual machine with the ability to run a greater variety of applications.

FIG. 1 is a block diagram showing an example process 100 by which a webassembly container engine can deploy and run a webassembly application using a webassembly unikernel, according to an example embodiment of the present disclosure. As shown in FIG. 1, the process 100 involves a container engine 112, a container image 116, and a virtual machine 118. The container engine 112 may comprise any portion or entirety of a software, program, module, plug-in, or code that: receives user requests; pulls, retrieves, and/or extracts container images; and runs or executes the container. In some embodiments, the container engine 112 may be executed on a computing system having resources that are shared, relied on, and/or allocated to a plurality of virtual machines via a hypervisor. The container image 116 may comprise a static file with executable code that can create a container on a computing system (e.g., the host computing system of the container engine 112). The container image 116 may be one of a plurality of other container images corresponding to a plurality of applications, and may be stored in a container registry. In some aspects, the container image 116 may comprise a packaged application, along with its dependencies, and information on what processes it runs when launched. The virtual machine 118 may comprise an emulation of a physical computer. The virtual machine 118 may rely on a portion of resources (e.g., hardware resources) of a host computing system that is allocated to or shared with the virtual machine using a hypervisor.

Process 100 may begin with the container engine 112 launching a container runtime 114 (process flow 102). The container runtime 114 may comprise a low-level component of the container engine 112 that mounts or associates container images (e.g., container image 116) and works with the kernel of the operating system associated with the container engine 112 to start and support the containerization process. The container runtime 114 may be used to generate a unikernel configured to run a plurality of webassembly applications (process flow 104). The configured unikernel may be referred to herein as webassembly unikernel 120. In some aspects, the webassembly unikernel 120 may comprise a webassembly interpreter/runtime functioning as a unikernel so that it can handle the running, deployment, and/or execution of multiple container images using webassembly. Furthermore, the webassembly unikernel 120 may be accessible to one or more virtual machines 118 created by and/or hosted by the computing system of the container engine 112 (e.g., virtual machine 118).

Process 100 may further include the container engine 112 pulling and/or extracting a container image 116 corresponding to a webassembly application and/or workload of an application (process flow 106). For example, the container engine 112 may specify the application that it wants to run (e.g., based on user request). The application may involve one or more workloads desired to be run by the user, and requested to be run by the container engine 112. As previously discussed, webassembly is a portable binary-code format for executable applications, which may allow such applications to become modifiable and/or more easily adaptable to running on operating systems having limited capabilities (e.g., virtual machines 118). The container engine 112 may locate, within a container registry storing a plurality of container images, the container image corresponding to the requested webassembly application or webassembly application workload for retrieval. In some aspects, the container engine may search for a webassembly version of the requested application and/or application workload in a container registry. In some aspects, the container image may be in the Open Container Initiative format, and may be pulled and/or extracted from a remote registry. The container engine 112 would then unpack the webassembly workload and/or webassembly application (referred to individually or collectively as webassembly payload) contained within the container image 116 to a local container storage.

In some embodiments, the container runtime 114 may specify, for example, how a user may want to run the webassembly application and/or application workload (e.g., based on information provided to the container engine 112 via a user request). In such embodiments, the container runtime 114 may specifically configure a unikernel to run webassembly applications based on the specifications indicated by the user.

At process flow 108, the container engine 112 may cause the workload and/or webassembly application (webassembly payload 122) to be accessible to the webassembly unikernel 120 (process flow 108). For example, the container engine 112 may send an address of the location at which the webassembly payload 122 was stored after it was unpacked from the container image 116. The webassembly unikernel 120 may be then run and/or execute the webassembly payload 122 on a virtual machine 118 (process flow 110).

Figure 2:
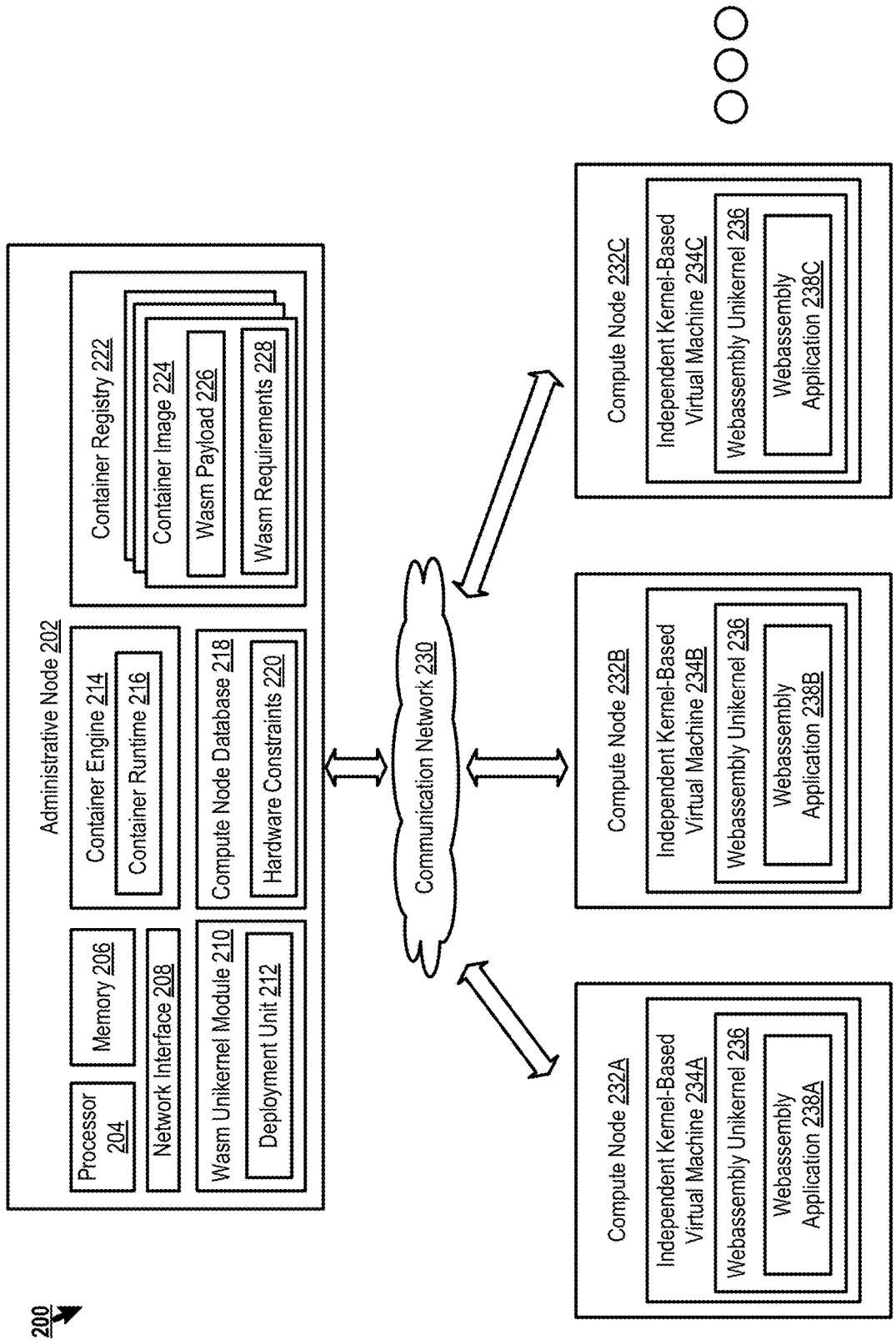
FIG. 2 is a block diagram of an example computer network environment for webassembly unikernel for webassembly containers, according to an example embodiment of the present disclosure.

FIG. 2 is a block diagram of an example computer network environment 200 for a webassembly unikernel for webassembly containers, according to an example embodiment of the present disclosure. The example computer network environment 200 may include an administrative node 202 managing and/or in communication with a plurality of compute nodes (e.g., compute node 232A-232C) via a communication network 230. In some embodiments, the administrative node 202 may comprise a server, host computing system (e.g., for creating a plurality of virtual machines via a hypervisor), and/or a host operating system (e.g., for the creation of containers). The administrative node 202 may be remotely from or local to the compute nodes, which may each be a device or computing system. For example, the administrative node 202 may be one or more of a remote or local server, a computing device (e.g., a laptop, tablet, smartphone, etc.), a special purpose computer, or another compute node elevated to or assigned responsibilities of performing functions of a node manager or node network administrator. Also or alternatively, the administrative node 202 may comprise a layer underlying the plurality of compute nodes. For example, the administrative node 202 may provide the kernel or hardware resources on which independent kernel-based virtual machines (KVM) (e.g., independent KVMs 234A-234C) of the various compute nodes rely on. In another example, the administrative node 202 may comprise the underlying operating system that various compute nodes shares or inherit a share of.

As shown in FIG. 2, the administrative node 202 may comprise one or more of a processor 204, a memory 206, a network interface 208, a webassembly (wasm) unikernel module 210, a container engine 214, a compute node database 218, and a container registry 222. The processor 204 may comprise any one or more types of digital circuit configured to perform operations on a data stream, including functions described in the present disclosure. The memory 206 may comprise any type of long term, short term, volatile, nonvolatile, or other memory and is not to be limited to any particular type of memory or number of memories, or type of media upon which memory is stored. Furthermore, the memory 206 may store computer-executable instructions that, when executed by the processor 204, can cause the processor 204 to perform one or more processes described herein. The network interface 208 may allow the administrative node 202 to communicate with one or more compute nodes (e.g., compute nodes 232A-232C) over the communication network 230. For example, the network interface 208 may comprise a wired interface (e.g., electrical, radiofrequency (RF) (e.g., via a coaxial cable), optical interface (via fiber)), a wireless interface, a modem, etc. In some aspects, the compute nodes may also have a respective network interface to facilitate communication.

The wasm unikernel module 210 may comprise any portion or entirety of a software, application, program, or plug-in that causes the administrative node 202 to generate, configure, and/or modify a wasm unikernel. In some aspects, the wasm unikernel module 210 may retrieve or generate a generic unikernel and then may modify or customize the unikernel (e.g., to become a wasm unikernel) to be able to run and/or execute a variety of webassembly applications. For example, the wasm unikernel module 210 may modify one or more parameters of the unikernel relating to a set of libraries or binaries corresponding to operating system services. The services may be selected to best allow the unikernel to run a variety of webassembly applications. In some embodiments, the parameters for a unikernel may further include, but are not limited to, security parameters, keys, IT policy, HTTPS gateway interface requirements, memory interface/storage, and/or data schemas. In some aspects, the wasm unikernel module 210 may rely on configuration and/or compatibility information associated with a compute node or a webassembly application to determine how a unikernel is to be customized. The wasm unikernel module 210 may further include a deployment unit 212, which may comprise any portion or entirety of a software, application, program, or plug-in that causes the administrative node 202 to deploy (e.g., via container engine 214) a wasm unikernel to a compute node (e.g., via a respective independent KVM).

The container engine 214 may comprise any portion or entirety of a software, program, module, plug-in, or code that pulls, retrieves, and/or extracts container images (e.g., responsive to user requests), and runs or executes the container image. The container engine 214 share and/or rely on the hardware and/or software (e.g., operating system) resources of the administrative node 202. The container runtime 216 may comprise a low-level component of the container engine 214 that mounts or associates container images (e.g., container image 214) and works with the kernel of the operating system of the administrative node 202 to start and support the containerization process. In some aspects, the container runtime 216 may cause the wasm unikernel module 210 to generate a wasm unikernel configured to run a plurality of webassembly applications.

The compute node database 218 may comprise a database or record of compute nodes in the example computer network 100 that is communicatively coupled to or managed by the administrative node 202. The compute nodes may be identifiable, for example, by device identifiers (e.g., of devices corresponding to the compute nodes), or an identifier of the instance or virtual machine corresponding to the compute node. In some aspects, the compute node database 218 may also store hardware constraints 220 and other capabilities or requirements pertaining to each compute node.

The container registry 222 may comprise a registry or repository of a plurality of container images 224 corresponding to a plurality of identifiable applications. For example, in order to run an application on an independent KVM at a compute node (e.g., responsive to a user request for the application), the administrative node 202 may search and/or query the container registry 222 for the container image 224 corresponding to the application. The container image 224 may store one or more payloads associated with the application in their webassembly format (e.g., wasm payload 226). In some aspects, each application may be converted to its webassembly format and stored (e.g., by the container registry 222). Furthermore, the container image 224 may also include requirements, specifications, and/or libraries associated with the wasm application to run the wasm application (referred to herein as wasm requirements 228).

The plurality of compute nodes may comprise isolated instances, virtual or physical systems, or servers relying on the resources (e.g., kernel, operating system, software or hardware resources) of the administrative node 202. For example, the compute nodes may each comprise an independent kernel-based virtual machines (KVM) (e.g., independent KVMs 234A-234C) that relies on, is an instance of, and/or shares the kernel or hardware resources of the administrative node 202. Also or alternatively, the plurality of compute nodes (e.g., compute nodes 232A-232C) may be separate devices. Each of these devices may include a processor, memory, and a network interface, which may share one or more components or functionalities as described for processor 104 and memory 106, and network interface 208. However, as previously discussed, the compute nodes and/or their respective independent KVMs can be resource constrained, and thus limited in their capabilities to run applications. Furthermore, as the administrative node 202 generates and customizes a webassembly unikernel 236 configured to run a plurality of webassembly applications, the independent KVMs 234A-234C may embed the webassembly unikernel 236 to run various webassembly applications that may each have different requirements (e.g., webassembly application 238A in compute node 232A, webassembly application 238B in compute bode 232B, and webassembly application 238C in compute node 232C).

Figure 3:
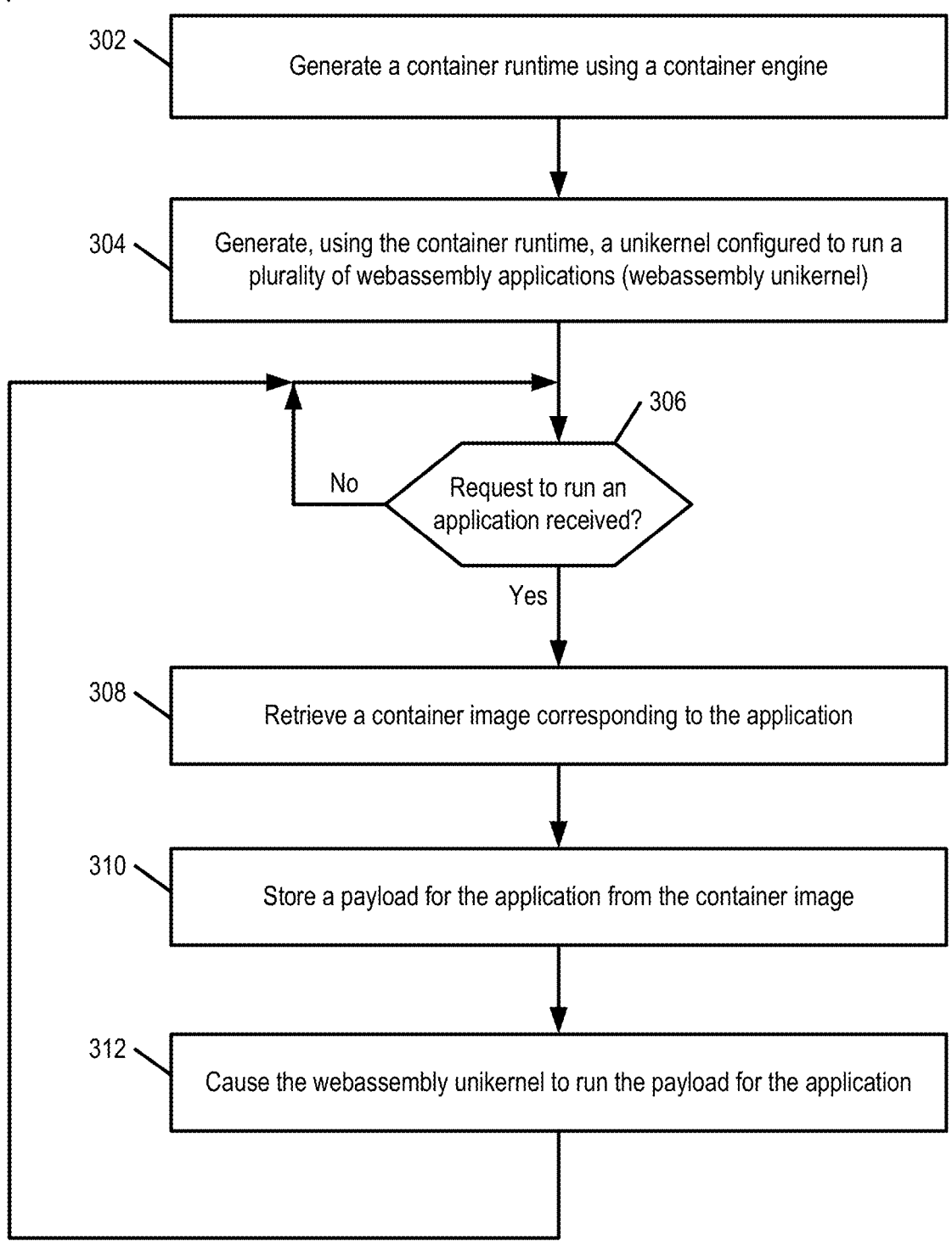
FIG. 3 is a flow chart illustrating an example process for a container engine to deploy and run a webassembly application using a webassembly unikernel, according to an example embodiment of the present disclosure.

FIG. 3 is a flow chart illustrating an example process 300 for a container engine to deploy and run a webassembly application using a webassembly unikernel, according to an example embodiment of the present disclosure. In some embodiments, one or more blocks of process 300 may be performed by the administrative node 202 (e.g., via the processor 204 based on instructions stored in memory 206). For simplicity, "computing device" may be used to refer to the administrative node 202 in process 300.

Process 300 may begin with the computing device generating a container runtime using a container engine (block 302). For example, container engine 112/214 may serve as an interface between the computing device and the container runtime 114/216, allowing a partitioning of the operating system resources of the computing device to be used for the container runtime 114/216. The container runtime 114/216 may comprise a low-level component of the container engine 112/214 that may link container images (e.g., container image 116/224) to start and support the containerization process, as will be discussed herein.

At block 304, the computing device may generate, using the container runtime, a unikernel configured to run a plurality of webassembly applications (e.g., a webassembly unikernel or wasm unikernel). In one embodiment, the computing device may retrieve a generic unikernel and may modify one or more parameters of the unikernel to be compatible with webassembly applications. For example, the wasm unikernel module 210 may modify one or more parameters of the unikernel relating to a set of libraries or binaries corresponding to operating system services. The services may be selected to best allow the unikernel to run a variety of webassembly applications. In some embodiments, the parameters for a unikernel may further include, but are not limited to, security parameters, keys, IT policy, HTTPS gateway interface requirements, memory interface/storage, and/or data schemas. The generated wasm unikernel may be deployed to virtual machines hosted or implemented by the computing device via the deployment unit 212.

At block 306, the computing device may determine whether a request to run an application has been received. For example, the computing device may receive a request from a user (e.g., via a user device) to run an application on a specific virtual machine and/or compute node (e.g., any one of compute nodes 232A-232C running independent KVMs 234A-234C, respectively). The application may be identifiable to the computing device or may be retrievable (e.g., via an application server or third party server associated with the application). In some aspects, the computing device may monitor receipt of this request in a periodic basis. If the request is attended to (e.g., by the performance of subsequent blocks in process 300), the computing device may remove the request from queue. Thus, if no request is received, the computing device may continue to periodically monitor for receipt of this request.

If the computing device determines that a request is received (and not processed yet), the computing device may retrieve a container image corresponding to the application (block 308). For example, container engine 112/214 may locate, within container registry 222, the container image corresponding to the requested application. The container registry 222 may store a webassembly version of the application. In some embodiments, the container registry 222 and/or the computing device may periodically convert applications or application workloads to webassembly formats for storage within container images in the container registry 222. In some aspects, the container image may be in the Open Container Initiative format, and may be pulled and/or extracted from a remote registry.

At block 310, the computing device may store a payload for the application from the container image. For example, the container engine 112/214 would then unpack the webassembly workload and/or webassembly application (referred to individually or collectively as webassembly payload) contained within the container image 116/224 to a local container storage. In some embodiments, the computing device may record the location or address at which the unpacked webassembly payload is stored At block 312, the computing device may cause the webassembly unikernel to run the payload for the application. For example, the payload may be rendered accessible to the webassembly unikernel 120 (process flow 108). In some embodiments, block 312 may involve the container engine 112/214 sending the address and/or the location at which the webassembly payload 122/226 was stored after it was unpacked from the container image 116/224. The webassembly unikernel 120 may be then run and/or execute the webassembly payload 122/226 on a virtual machine of the compute node pertaining to the request (e.g., one of independent KVMs 234A-234C of compute nodes 232A-232C, respectively). Also or alternatively, the computing device may cause the webassembly unikernel to run the payload by sending, to the webassembly unikernel, the webassembly payload for the application. As will be discussed herein, process 400 shown in FIG. 4 describes an example embodiment of block 312. In some embodiments, the computing device may receive user input (e.g., as part of the original request in block 306) on how a user wants to run the application. The computing device can create a container specification configured based on how the user wants to run the application. The computing device may thus cause webassembly unikernel to run the webassembly payload for the application based on the container specification.

Figure 4:
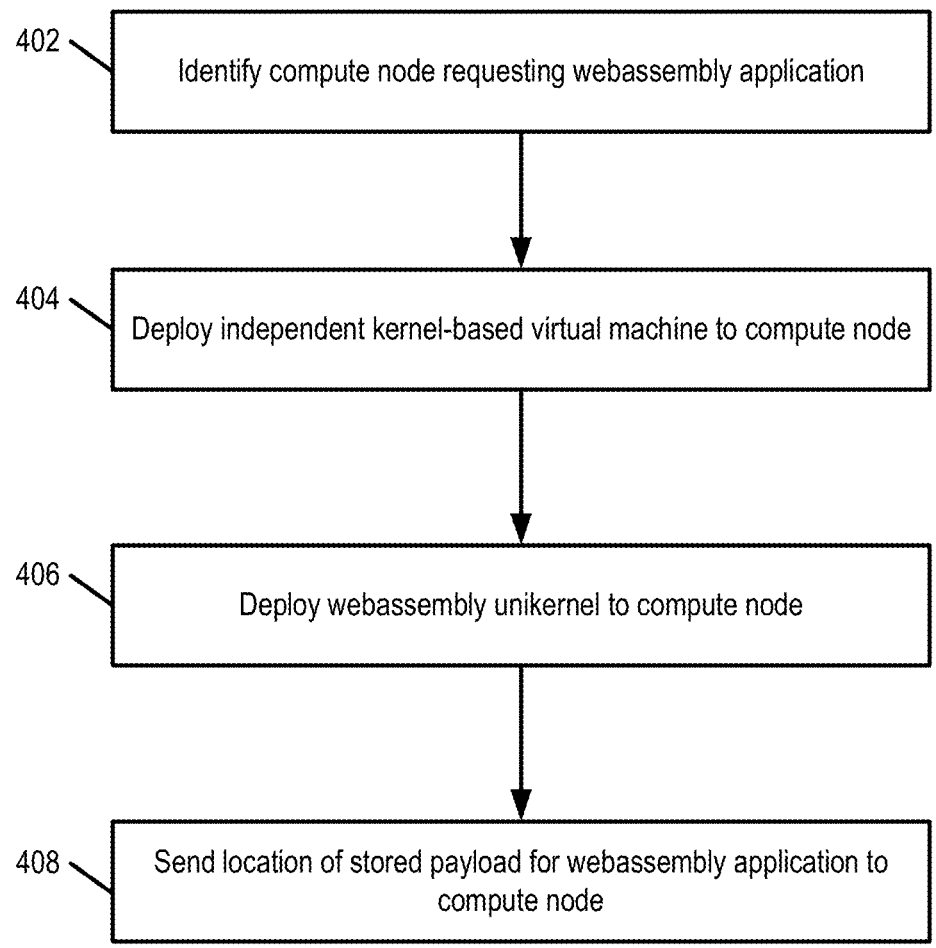
FIG. 4 is a flow chart illustrating an example process for deploying a webassembly unikernel and causing a compute node to run a webassembly application, according to an example embodiment of the present disclosure.

FIG. 4 is a flow chart illustrating an example process 400 for deploying a webassembly unikernel and causing a compute node to run a webassembly application, according to an example embodiment of the present disclosure. In some embodiments, one or more blocks of process 400 may be performed by the administrative node 202 (e.g., via the processor 204 based on instructions stored in memory 206). For simplicity, "computing device" may be used to refer to the administrative node 202 in process 400.

Process 400 may begin at block 402 with the computing device identifying the compute node requesting a webassembly application. For example, the request determined to be received at block 306 of process 300 may indicate the specific compute node desiring to run the webassembly application. In one embodiment, the computing device may identify the compute node using compute node database 218. For example, if the compute node is a device separate from the administrative node 202, the compute node may be identified by a device identifier, and the software and/or hardware constraints and capabilities of the compute node may be determined.

At block 404, the computing device may deploy an independent kernel-based virtual machine (independent KVM) to the compute node. In one aspect, the computing device may cause the identified compute node to run a virtual machine that relies on a kernel of the computing device. For example, the computing device may share or apportion its computing resources to the virtual machine via a hypervisor, and that virtual machine may be accessed by the compute node. Also or alternatively, the compute node may be given privileges to access or share a running instance of the virtual machine on a device associated with the compute node.

At block 406, the compute node may deploy a webassembly unikernel to the compute node. For example, the webassembly unikernel generated at block 304 of process 300 may be deployed (e.g., using deployment unit 212) to the compute node identified in block 402 as requesting the webassembly application. Moreover, the deployed webassembly unikernel may have been configured to have just enough features to run the webassembly application.

At block 408, the computing device may send the location of the stored payload of the webassembly application to the compute node. For example, after the webassembly application is unpacked from the container image 116/224, a payload for the webassembly application may be stored. The location of the storage of the webassembly application may be within the computing device. In some embodiments, the location may be within a virtual memory associated with the deployed virtual machine. The container engine 112/214 may send the address and/or the location of the webassembly application to the identified compute node so that the independent KVM may run the webassembly application.

By using the independent KVM and deploying a webassembly unikernel on to the independent KVM to run applications, the compute node can run the webassembly application in isolation from other applications. The ability to run applications effectively under the limited resources provided by virtual machines, while at the same time utilizing the benefits of containerization and isolation, can also help facilitate the goals of confidential computing, by preventing unauthorized access or modification of applications and data while in use. Furthermore, by specifying the payload to be run (e.g., by sending an address of the stored webassembly payload directly to the compute node), the compute node and the independent KVM running within the compute node is cognizant of the webassembly application, further preventing unauthorized or unintentional running of malicious software.

Figure 5:
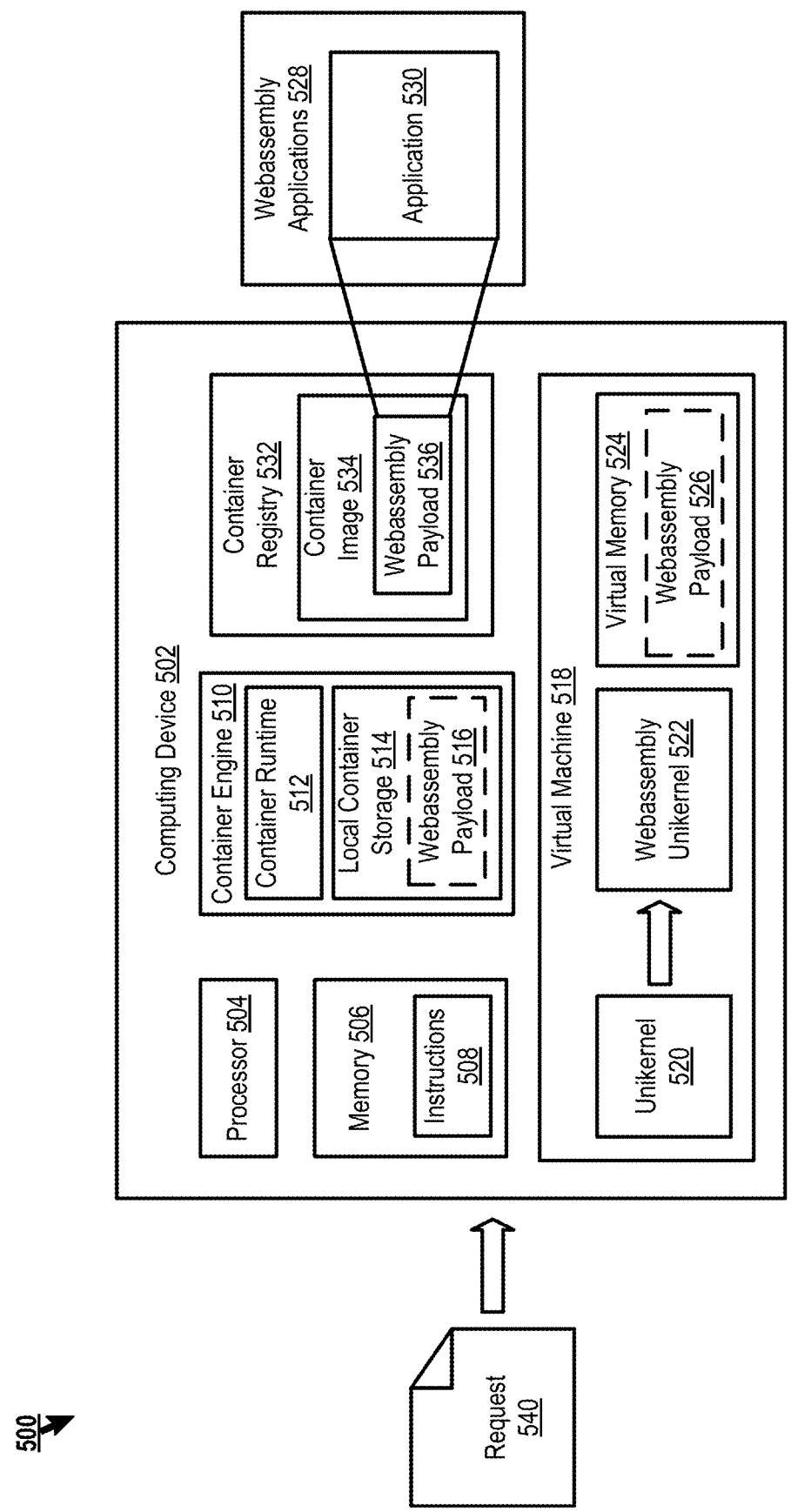
FIG. 5 is a block diagram showing one or more components of a webassembly unikernel for webassembly containers, according to an example embodiment of the present disclosure.

FIG. 5 is a block diagram showing a system 500 of one or more components of a webassembly unikernel for webassembly containers, according to an example embodiment of the present disclosure. The system 500 may be used for deploying and running webassembly workloads on compute nodes using a webassembly unikernel. The system may include a computing device 502 comprising a processor 504 and a memory 506 storing computer-executable instructions 508. When the instructions 508 are executed by the processor 504, the instructions 508 may cause the processor 504 to: generate, using a container engine 510, a container runtime 512; generate, using the container runtime 512, a unikernel 520 configured to run a plurality of webassembly applications 528, thereby resulting in a webassembly unikernel 522; receive a request 540 to run an application 530; retrieve, via the container engine 510, a container image 534 corresponding to the application 530 from a container registry 532; store a webassembly payload 536 for the application 530 from the container image 534; and cause the webassembly unikernel 522 to run the webassembly payload 526 for the application 530. In some embodiments, the webassembly unikernel 522 may be deployed to a virtual machine 518. For example, after container image 534 is retrieved, the webassembly payload 536 may be stored within a virtual memory 524. The webassembly unikernel 522 may run the webassembly payload 526 for the application 530 on the virtual machine 518. Also or alternatively, the webassembly payload 516 may be stored in a local container storage 514 of the computing device 502.

It will be appreciated that all of the disclosed methods and procedures described herein can be implemented using one or more computer programs or components. These components may be provided as a series of computer instructions on any conventional computer readable medium or machine-readable medium, including volatile or non-volatile memory, such as RAM, ROM, flash memory, magnetic or optical disks, optical memory, or other storage media. The instructions may be provided as software or firmware, and/or may be implemented in whole or in part in hardware components such as ASICs, FPGAs, DSPs or any other similar devices. The instructions may be configured to be executed by one or more processors, which when executing the series of computer instructions, performs or facilitates the performance of all or part of the disclosed methods and procedures.

It should be understood that various changes and modifications to the example embodiments described herein will be apparent to those skilled in the art. For example, applications may be stored or contained in the container image in languages or formats other than webassembly (e.g., JAVASCRIPT), and the unikernel deployed at the compute node may be configured to run applications based on those languages or formats. Such changes and modifications can be made without departing from the spirit and scope of the present subject matter and without diminishing its intended advantages. It is therefore intended that such changes and modifications be covered by the appended claims.

What is claimed is:

1. A method comprising:
generating, by a computing device having a processor and by using a container engine, a container runtime;
generating, by using the container runtime, a unikernel configured to run a plurality of webassembly applications, thereby resulting in a webassembly unikernel;
receiving, by the computing device, a request to run an application;
retrieving, by the computing device and via the container engine, a container image corresponding to the application from a container registry;
storing a webassembly payload for the application from the container image; and
causing the webassembly unikernel to run the webassembly payload for the application.

2. The method of claim 1, further comprising:
deploying the webassembly unikernel to a virtual machine, wherein the webassembly unikernel runs the webassembly payload for the application on the virtual machine.

3. The method of claim 2, wherein the webassembly payload is stored in a memory associated with the virtual machine.

4. The method of claim 1, wherein the webassembly payload is stored in local container storage of the computing device.

5. The method of claim 1, wherein the request specifies, to the container engine, the container image corresponding to the application.

6. The method of claim 1, wherein the retrieving further comprises:
unpacking, from the container image, the webassembly payload for the application.

7. The method of claim 1, further comprising:
receiving, by the computing device, user input on how a user wants to run the application; and
creating a container specification configured based on how the user wants to run the application, wherein the webassembly unikernel runs the webassembly payload for the application based on the container specification.

8. The method of claim 1, wherein the causing the webassembly unikernel to run the webassembly payload comprises:
sending, to the webassembly unikernel, the webassembly payload for the application.

9. The method of claim 1, wherein the causing the webassembly unikernel to run the webassembly payload comprises:
sending, to the webassembly unikernel, a location of the stored webassembly payload for the application.

10. A system comprising:
a processor; and
a memory storing instructions which, when executed by the processor, cause the processor to:
generate, by using a container engine, a container runtime;
generate, by using the container runtime, a unikernel configured to run a plurality of webassembly applications, thereby resulting in a webassembly unikernel;
receive a request to run an application;
retrieve, via the container engine, a container image corresponding to the application from a container registry;
store a webassembly payload for the application from the container image; and
cause the webassembly unikernel to run the webassembly payload for the application.

11. The system of claim 10, wherein the instructions, when executed, further cause the processor to:
deploy the webassembly unikernel to a virtual machine, wherein the webassembly unikernel runs the webassembly payload for the application on the virtual machine.

12. The system of claim 11, wherein the webassembly payload is stored in a virtual memory associated with the virtual machine.

13. The system of claim 10, wherein the webassembly payload is stored in local container storage of the system.

14. The system of claim 10, wherein the request specifies, to the container engine, the container image corresponding to the application.

15. The system of claim 10, wherein the instructions, when executed, cause the processor to:
retrieve by unpacking, from the container image, the webassembly payload for the application.

16. The system of claim 10, wherein the instructions, when executed, further cause the processor to:
receive user input on how a user wants to run the application; and
create a container specification configured based on how the user wants to run the application, wherein the webassembly unikernel runs the webassembly payload for the application based on the container specification.

17. The system of claim 10, wherein the instructions, when executed, cause the processor to cause the webassembly unikernel to run the webassembly payload by:
sending, to the webassembly unikernel, the webassembly payload for the application.

18. The system of claim 10, wherein the instructions, when executed, cause the processor to cause the webassembly unikernel to run the webassembly payload by:
sending, to the webassembly unikernel, a location of the stored webassembly payload for the application.

19. A non-transitory computer-readable medium storing instructions which, when executed by a processor, cause the processor to:
generate, by using a container engine, a container runtime;
generate, by using the container runtime, a unikernel configured to run a plurality of webassembly applications, thereby resulting in a webassembly unikernel;
receive a request to run an application;
retrieve, via the container engine, a container image corresponding to the application from a container registry;
store a webassembly payload for the application from the container image; and
cause the webassembly unikernel to run the webassembly payload for the application.

20. The non-transitory computer-readable medium of claim 19, the instructions, when executed by the processor, further cause the processor to:
deploy the webassembly unikernel to a virtual machine, wherein the webassembly unikernel runs the webassembly payload for the application on the virtual machine.

* * * * *